(12) United States Patent
Zhao et al.

(10) Patent No.: US 12,042,865 B2
(45) Date of Patent: Jul. 23, 2024

(54) HIGH-THROUGHPUT 3D PRINTING SYSTEM FOR PREPARING MULTI-COMPONENT, SMALL SIZED SAMPLES

(71) Applicant: NCS Testing Technology CO., LTD, Beijing (CN)

(72) Inventors: Lei Zhao, Beijing (CN); Hui Wang, Beijing (CN); Lixia Yang, Beijing (CN); Haizhou Wang, Beijing (CN); Xuejing Shen, Beijing (CN); Yunhai Jia, Beijing (CN); Dongling Li, Beijing (CN); Xing Yu, Beijing (CN); Suran Liu, Beijing (CN)

(73) Assignee: NCS TESTING TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 17/992,447

(22) Filed: Nov. 22, 2022

(65) Prior Publication Data

US 2024/0066602 A1    Feb. 29, 2024

(51) Int. Cl.
*B22F 12/58*   (2021.01)
*B22F 9/04*    (2006.01)
*B33Y 30/00*   (2015.01)
*B33Y 40/10*   (2020.01)

(52) U.S. Cl.
CPC .............. *B22F 12/58* (2021.01); *B22F 9/04* (2013.01); *B33Y 30/00* (2014.12); *B33Y 40/10* (2020.01)

(58) Field of Classification Search
CPC .. B22F 12/58; B22F 9/04; B22F 12/52; B22F 10/85; B22F 12/57; B22F 12/55; B33Y 30/00; B33Y 40/10; B33Y 50/02; B33Y 40/00; B29C 64/307; B29C 64/314; B29C 64/321; B29C 64/336; B29C 64/343
See application file for complete search history.

(56) References Cited

U.S. PATENT DOCUMENTS

| | | | |
|---|---|---|---|
| 2019/0054521 A1 | 2/2019 | Li et al. | |
| 2019/0099769 A1* | 4/2019 | Holverson | ............ B05B 12/18 |

FOREIGN PATENT DOCUMENTS

| CN | 108097956 A | * | 6/2018 | ............ B22F 10/00 |
| CN | 110328366 A | * | 10/2019 | ............ B22F 10/00 |
| CN | 110722161 A | * | 1/2020 | ............ B22F 10/00 |
| CN | 113828241 A | * | 12/2021 | |
| CN | 114178552 A | | 3/2022 | |

(Continued)

*Primary Examiner* — Seyed Masoud Malekzadeh
*Assistant Examiner* — Vipul Malik
(74) *Attorney, Agent, or Firm* — Muncy, Geissler, Olds & Lowe, P.C.

(57) ABSTRACT

A high-throughput 3D printing system for preparing multi-component, small sized samples, includes a raw material supply module, providing a various kinds of metal powders for printing small sized samples; the first mixer module, mixing the metal powders obtained from the raw material supply module to generate the first blended metal powders; the second mixer module, mixing the first mixed metal powders, in order to generate the second blended metal powders for printing small sized samples; the first printing module, printing the secondary blended metal powder into a small-sized sample; a control module, controlling other functional modules of the high-throughput 3D printing system for generating small-size samples.

8 Claims, 1 Drawing Sheet

(56) References Cited

FOREIGN PATENT DOCUMENTS

| | | |
|---|---|---|
| CN | 111185597 A | 5/2022 |
| CN | 114493261 A | 5/2022 |
| WO | WO-2020068076 A1 * 4/2020 | ........... B29C 64/314 |

* cited by examiner

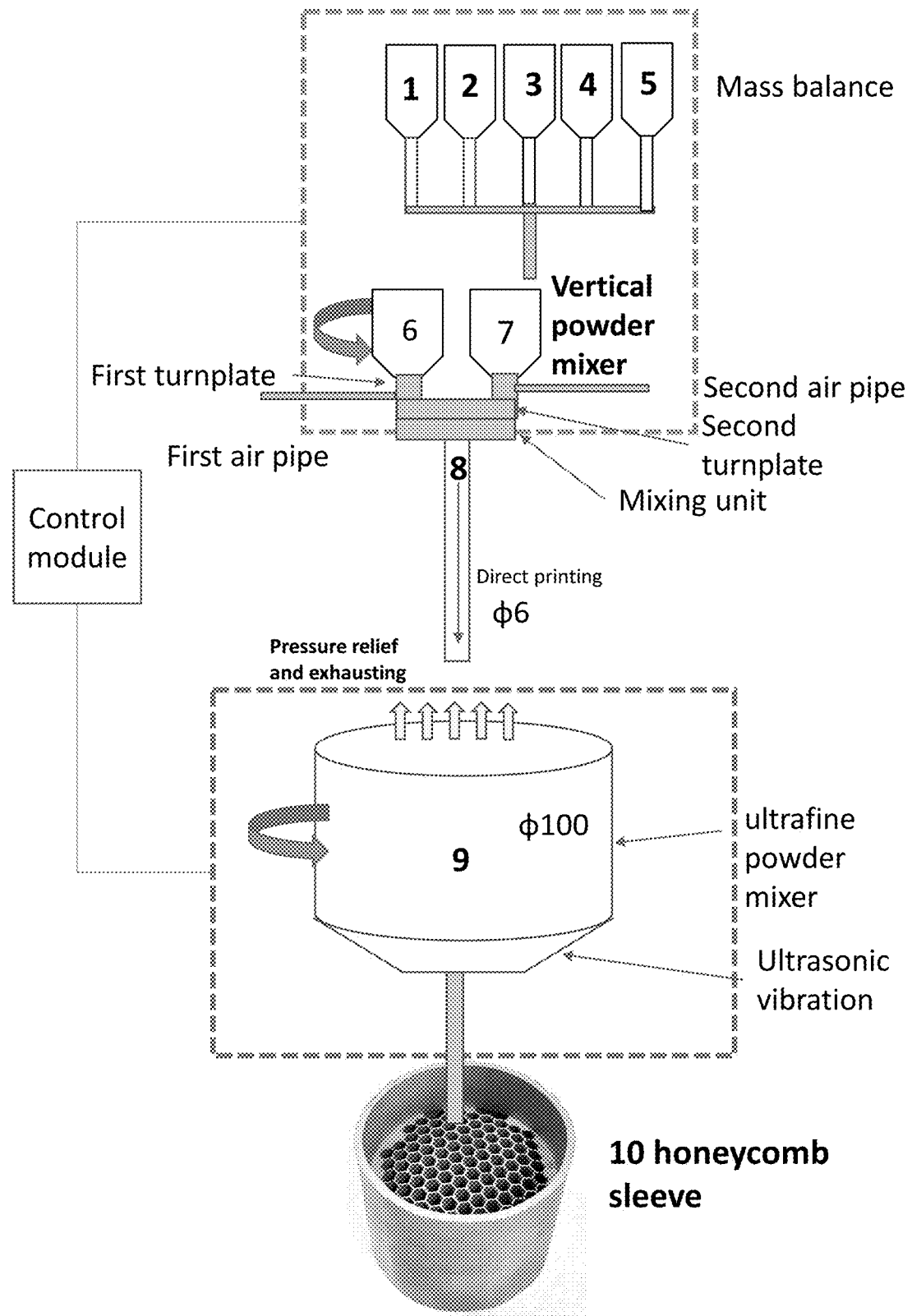

HIGH-THROUGHPUT 3D PRINTING SYSTEM FOR PREPARING MULTI-COMPONENT, SMALL SIZED SAMPLES

TECHNICAL FIELD

This invention relates to the technical field of signal generator circuit design, particularly, related to high-throughput 3D printing system for preparing multi-component, small sized samples

BACKGROUND

The existing high-throughput 3D printing equipment (using a plurality of raw material powder tanks to prepare multi-component materials for powder mixing and subsequent printing) mainly is used for printing large sized sample, resulting in consuming an excessive amount of powder, therefore, it is not beneficial to use the existing high-throughput 3D printing equipment for preparation of multi-component small-size samples in scientific research laboratories, moreover, the multi-component powder distribution adopts continuous powder feeding mode, which leads to the dynamic change (i.e. unfixed) to the component proportion of blended powder in each component, and this part of blended powder with unfixed component proportion is generally discarded, resulting in waste and low printing efficiency. Therefore, there is urgent to have a high-throughput 3D printing system for preparing multi-component, small-sized samples, in order to solve the waste and low efficiency of existing 3D printing equipment when used to prepare multi-component small-size samples.

SUMMARY

A high-throughput 3D printing system for preparing multi-component, small sized samples, comprising:
  a raw material supply module, providing a various kinds of metal powders for printing small sized samples;
  the first mixer module, mixing the metal powders obtained from the raw material supply module to generate the first blended metal powders;
  the second mixer module, mixing the first blended metal powders to generate the second blended metal powders for printing small-sized samples;
  the first printing module, printing the second blended metal powders into a small-sized sample;
  a control module, controlling the raw material supply modules to provide the metal powders to the first mixer module in sequence, according to the material composition and print path of the small sized sample;
  the control module, controlling the first mixer module to mix the metal powder into the first blended metal powders, then, providing the first blended metal powders to the second mixer module, wherein, the second mixer module mixes the first blended metal powders into the second blended metal powders;
  the control module, obtaining the degree of inhomogeneity of the second blended metal powders, and selecting the second blended metal powders with required degree of inhomogeneity, controlling the printing module to use the selected second blended metal powders to generate small sized sample.
Preferably, the high-throughput 3D printing system is a desktop system.

Preferably, the raw material supply module consists of a plurality of groups of material storage units, wherein, each group of material storage unit is used for storing different or the same metal powders, wherein, when the storage units store the same metal powders, the granularity of the metal powder in each group of the material storage units is different; when the storage units store different metal powders, the granularity of the metal powders in each group of the material storage units could be the same or different.
Preferably, the first mixer module, comprising:
  the first vertical powder mixer, using compressed air to mix at least two kinds of metal powders, in order to obtain the first blended powders, wherein, the first blended powders is used to generate the second blended metal powders, and the granularity of the metal powders used for generating the first blended powder is the same;
  the second vertical powder mixer, using compressed air to mix at least two kinds of metal powders, in order to obtain the second blended powders, wherein, the second blended powders is used to generate the second blended metal powders, and the granularity of the metal powder used to generate the second blended powder is the same;
  the first blended powder and the second blended powder are used to indicate the first blended metal powder with different particle sizes;
  the first air pipe, connecting with the first vertical powder mixer or the second vertical powder mixer, wherein, the first air pipe is used for providing the first airflow for the first vertical powder mixer or the second vertical powder mixer;
  the second air pipe, connecting with the second vertical powder mixer or the first vertical powder mixer, wherein, the second air pipe, providing the second air flow for the second vertical powder mixer or the first vertical powder mixer, wherein, the first air pipe and the second air pipe are not connected with the same vertical powder mixer;
  the first turnplate, which is arranged at lower end of vertical powder mixer to connect with the air pipe in a penetrating way; the first turnplate, adding different volumes of the first mixed metal powder to the second mixing module by controlling the rotation angle.
Preferably, the second mixer module, comprising:
  the second turnplate, which is arranged at that lower end of the second mixer module; the second turnplate, driving the first and second vertical powder mixer to rotate clockwise and/or counterclockwise, wherein, the first air pipe and the second air pipe do not provide the first air flow and the second air flow when the turnplate rotates clockwise or counterclockwise, and the turnplate connects the first air pipe and the second air pipe to provide the first air flow and the second air flow when the rotation of turnplate stops; and when rotation radius of the turnplate does not exceed the length of the air pipe during clockwise and counterclockwise rotation, the turnplate connects the first air pipe and the second air pipe, providing the first air flow and the second air flow during rotation;
  the mixing unit, using the first airflow and the second airflow to prepare the first blended powders and the second blended powders into the second blended metal powders with the same granularity, wherein, the mixing unit is arranged at the upper end of the first printing module.

Preferably, the control module, controlling the first turnplate, the second turnplate, the first air pipe and the second air pipe; and obtaining the granularity of metal powders to control the first mixer module and the second mixer module to generate the second blended metal powders.

Preferably, the high-throughput 3D printing system, also comprising:

the ultrafine powder mixer, decompressing and preparing the second blended metal powders into ultrafine powder;

the ultrasonic vibration module, which is arranged outside the ultrafine powder mixer for assisting in the preparation of ultrafine powder;

the second printing module, making the ultrafine powder into the small-size sample;

the honeycomb sleeve, having a plurality of honeycomb holes, and load bearing the ultrafine powder through the honeycomb holes to generate the small-size sample.

the control module, controlling the ultrafine powder mixer, the ultrasonic vibration module, the second printing module and the honeycomb sleeve;

the control module, controlling the ultrafine powder mixer and the ultrasonic vibration module according to the granularity and the volume of the powder material required for small-sized sample;

the ultrafine powder mixer and the ultrasonic vibration module, grinding the second blended metal powders into blended metal powder with the required granularity;

the second printing module and the honeycomb sleeve, using blended metal powder with the required granularity to generate the small sized sample.

Preferably, the control module, grinding the second blended metal powder into metal blended powder with the same granularity, and controlling the honeycomb sleeve to prepare the small-size sample according to the position of the second printing module.

Preferably, the control module, grinding the second blended metal powder into blended metal powder with different granularity, and controlling the second printing module and the honeycomb sleeve to prepare the small-size sample.

The invention discloses the following technical effects:

According to this invention, the 3D printing system is a desktop equipment, it is not only small in volume, and consumes fewer metal powders, but is applicable for scientific research laboratories to prepare multi-component, small sized samples.

This invention adopts stepwise powder mixing, realizing blended powders with fixed proportion of intermediate components, thus reducing the waste of raw material and improving the preparation efficiency.

BRIEF DESCRIPTION OF DRAWINGS

In order to more clearly explain the embodiments of the present invention or the technical solutions in the prior art, the following will briefly introduce the drawings that need to be used in the embodiments. Obviously, the drawings in the following description are only some embodiments of the present invention. For those of ordinary skill in the art, other drawings can be obtained according to these drawings without any creative effort.

FIG. 1 illustrates a schematic view of the high-throughput 3D printing system for preparing multi-component, small sized samples

DETAILED DESCRIPTION OF EMBODIMENTS

In order to make the purpose, technical scheme and advantages of the embodiments of this application clearer, the technical scheme in the embodiments of this application will be clearly and completely described below with reference to the drawings in the embodiments of this application. Obviously, the described embodiments are only part of the embodiments of this application, but not all of them. Generally, the components of the embodiments of the present application described and illustrated in the drawings herein can be arranged and designed in various different configurations. Therefore, the following detailed description of the embodiments of this application provided in the drawings is not intended to limit the scope of the claimed application, but only to represent selected embodiments of this application. Based on the embodiment of this application, all other embodiments obtained by the skilled person without creative labor belong to the scope of protection of this application.

As FIG. 1 illustrated, A high-throughput 3D printing system for preparing multi-component, small sized samples, comprising:

a raw material supply module, providing a various kinds of metal powders for printing small sized samples;

the first mixer module, mixing the metal powders obtained from the raw material supply module to generate the first blended metal powders;

the second mixer module, mixing the first blended metal powders to generate the second blended metal powders for printing small-sized samples;

the first printing module, printing the second blended metal powders into a small-sized sample;

The control module; controlling the raw material supply module to sequentially supply metal powders to the first mixer module according to the material composition and printing path of the small-size sample, and controlling the first mixer module to mix the metal powder into the first blended metal powder, next, providing the first blended metal powder to the second mixer module, mixing the first blended metal powder in the second mixer module to make the second blended powder, and obtaining the degree of inhomogeneity of the second blended metal powders, and selecting the second blended metal powders with required degree of inhomogeneity, controlling the printing module to use the selected second blended metal powders to generate small sized sample.

Preferably, the high-throughput 3D printing system provided by the invention is a desktop system with small volume, and takes up small space, it is convenient carrying and assembly, and these advantages effectively solves the space occupancy of the traditional high-throughput 3D printing equipment.

Preferably, the raw material supply module consists of a plurality of groups of material storage units, wherein, each group of material storage unit is used for storing different or the same metal powders, wherein, when the storage units store the same metal powders, the granularity of the metal powder in each group of the material storage units is different; when the storage units store different metal powders, the granularity of the metal powders in each group of the material storage units could be the same or different.

As for the design of the above-mentioned raw material supply module, it can be understood that the storage unit is shown in FIG. 1 as raw material powder tanks 1-5. Although FIG. 1 shows five side-by-side connection structures, in actual use, the number of raw material powder tanks can be added or reduced according to the composition of the final prepared sample, moreover, the connection modes of raw material powder tanks can be in various ways, such as side-by-side connection, connection with a specific shape, and forming powder tank group by combining several raw material powder tanks, and each powder tank group is respectively arranged at the position corresponding to the first mixing module.

Preferably, the first mixer module, comprising:

the first vertical powder mixer, using compressed air to mix at least two kinds of metal powders, in order to obtain the first blended powders, wherein, the first blended powders is used to generate the second blended metal powders, and the granularity of the metal powders used for generating the first blended powder is the same;

the second vertical powder mixer, using compressed air to mix at least two kinds of metal powders, in order to obtain the second blended powders, wherein, the second blended powders is used to generate the second blended metal powders, and the granularity of the metal powder used to generate the second blended powder is the same;

the first blended powder and the second blended powder are used to indicate the first blended metal powder with different particle sizes;

the first air pipe, connecting with the first vertical powder mixer or the second vertical powder mixer, wherein, the first air pipe is used for providing the first airflow for the first vertical powder mixer or the second vertical powder mixer;

the second air pipe, connecting with the second vertical powder mixer or the first vertical powder mixer, wherein, the second air pipe, providing the second air flow for the second vertical powder mixer or the first vertical powder mixer, wherein, the first air pipe and the second air pipe are not connected with the same vertical powder mixer;

the first turnplate, which is arranged at lower end of vertical powder mixer to connect with the air pipe in a penetrating way; the first turnplate, adding different volumes of the first mixed metal powder to the second mixing module by controlling the rotation angle.

In aspect of designing of the first mixer module, according to the present invention, the ordinal numeral "first" and "second" of the first and second vertical powder mixer are not limited in number, it is only to indicate that vertical powder mixers described in the invention are different ones. According to this invention, the number of vertical powder mixer is at least two;

Once the powder mixer completes powder mixing and provides the blended metal powder to the second mixer module, new metal powders can be added to the powder mixer for mixing, and the newly added metal powders can be the same as or different from the granularity of the initial mixed metal powders.

The control module sequentially controls the powder mixing process according to the requirements of different granularity of each metal powder, wherein, the air pipe is arranged to provide air flow for the first and second mixing modules.

Preferably, the second mixer module, comprising:

the second turnplate, which is arranged at that lower end of the second mixer module; the second turnplate, driving the first and second vertical powder mixer to rotate clockwise and/or counterclockwise, wherein, the first air pipe and the second air pipe do not provide the first air flow and the second air flow when the turnplate rotates clockwise or counterclockwise, and the turnplate connects the first air pipe and the second air pipe to provide the first air flow and the second air flow when the rotation of turnplate stops; and when rotation radius of the turnplate does not exceed the length of the air pipe during clockwise and counterclockwise rotation, the turnplate; connecting the first air pipe and the second air pipe, and providing the first air flow and the second air flow during rotation;

the mixing unit, using the first airflow and the second airflow to prepare the first blended powders and the second blended powders into the second blended metal powders with the same granularity, wherein, the mixing unit is arranged at the upper end of the first printing module.

When using the mixing unit, one should control the number of opened air pipes according to the granularity of the feeding material after the first mixer module completes mixing, the air pipes provide air flow to the second mixer module, so as to prepare the second blended metal powder with uniform blending. According to the movement of turnplate, the inlet of air flow can be set as swing and inflate in a small amplitude or inflate after rotating.

Further, the control module, controlling the first turnplate, the second turnplate, the first air pipe and the second air pipe; and obtaining the granularity of metal powders to control the first mixer module and the second mixer module to generate the second blended metal powders.

More preferably, the high-throughput 3D printing system, also comprising:

the ultrafine powder mixer, decompressing and processing the second blended metal powders into ultrafine powder;

the ultrasonic vibration module, which is arranged outside the ultrafine powder mixer for assisting in the preparation of ultrafine powder;

the second printing module, making the ultrafine powder into the small-size sample;

the honeycomb sleeve, having a plurality of honeycomb holes, and load bearing the ultrafine powder through the honeycomb holes to generate the small-size sample.

the second printing module, making the ultrafine powder into the small-size sample;

the honeycomb sleeve, having a plurality of honeycomb holes, and load bearing the ultrafine powder through the honeycomb holes to generate the small-size sample.

More preferably, the control module, controlling the ultrafine powder mixer, the ultrasonic vibration module, the second printing module and the honeycomb sleeve; the control module, controlling the ultrafine powder mixer and the ultrasonic vibration module according to the granularity and the volume of the powder material required for small-sized sample; controlling the ultrafine powder mixer and the ultrasonic vibration module to grind the second blended metal powders into blended metal powder with the required granularity; and the second printing module and the honeycomb sleeve, using blended metal powder with the required granularity to generate the small sized sample.

More preferably, the control module, grinding the second blended metal powder into metal blended powder with the same granularity, and controlling the honeycomb sleeve to prepare the small-size sample according to the position of the second printing module.

More preferably, according to this invention, the control module is also used for grinding the second blended metal powder into blended metal powder with different granularity, and controlling the second printing module and the honeycomb sleeve to prepare small-sized samples.

During this process, according to the requirements of different granularity, the 3D printing system of this invention simultaneously controls the second printing module and the honeycomb sleeve, and prints small-sized samples according to the printing path and the requirements of different metal granularity on the printing path. It can be understood that the second printing module is mainly used to generate blended metal powders with different granularity, and control the honeycomb sleeve to meet the requirements of the printing path.

Embodiment 1

As shown in FIG. 1, wherein, 1-5 shows raw material powder tank 1-5, 6-7 shows vertical powder mixer 6-7, 8 shows nozzle, 9 shows ultrafine powder mixer with ultrasonic vibration module, and 10 shows honeycomb with several honeycomb holes, which can also be called honeycomb sleeve.

weighing a certain amount of metal powder from the raw material powder tanks 1-5 as the mixed powder with the first component ratio, and feeding the mixed powder to the vertical powder mixer 6, then weighing the mixed powder with the second component ratio, and feeding the powders to the vertical powder mixer 7, both the vertical powder mixer 6 and the vertical powder mixer 7 can uniformly mix the powder by using air flow. When the powder is evenly mixed in the vertical powder mixer 6, the powder is distributed to the nozzle 8 through the turnplate and air path. The powder can be directly sprayed from the nozzle 8 for 3D printing, or distributed to the ultrafine powder mixer 9 for pressure relief and exhausting, and then filled into the holes of the honeycomb sleeve 10.

The vertical powder mixer 7 starts to distribute the evenly mixed powder with second component ratio to the nozzle 8, and at this time, the mixed powder with third component ratio is weighed and mixed in the vertical powder mixer 6, repeating such process until hundreds of component mixed powders can be prepared circularly.

Ultra-fine powder mixer 9 is a detachable device. Removing the ultra-fine powder mixer 9 can realize the 3D printing of powder mixing, and adding the ultra-fine powder mixer 9 can realize the automatic filling of the honeycomb sleeve 10. The ultrafine powder mixer 9 includes an ultrasonic vibration module, which is used to avoid the agglomeration of ultra-fine powder and improve the uniformity of mixing.

The present invention is described with reference to flowcharts and/or block diagrams of methods, devices (systems), and computer program products of embodiments of the present invention. It should be understood that each flow and/or block in flowchart and/or block diagram, and combinations of flows and/or blocks in flowchart and/or block diagram can be realized by computer program instructions. These computer program instructions may be provided to the processor of a general-purpose computer, a special-purpose computer, an embedded processor or other programmable data processing equipment to produce a machine, so that the instructions executed by the processor of the computer or other programmable data processing equipment produce means for implementing the functions specified in one or more flow charts and/or one or more blocks of the block diagram.

In the description of the present invention, it should be understood that the terms "first" and "second" are only used for descriptive purposes, and cannot be understood as indicating or implying relative importance or implicitly indicating the number of indicated technical features. Therefore, the features defined as "first" and "second" may include one or more of these features explicitly or implicitly. In the description of the present invention, "multiple" means two or more, unless otherwise specifically defined.

Obviously, those skilled in the art can make various changes and modifications to the present invention without departing from the spirit and scope of the present invention. Thus, if these modifications and variations of the present invention fall within the scope of the claims of the present invention and their technical equivalents, the present invention is also intended to include these modifications and variations.

What is claimed is:

1. A high-throughput 3D printing system for preparing multi-component, small sized samples, comprising:
   a raw material supply module, providing different kinds of metal powder for printing small sized samples;
   a first mixer module, stirring a metal powder obtained from the raw material supply module to generate a first blended metal powder;
   a second mixer, stirring the first blended metal powder to generate a second blended metal powder for printing small-sized samples;
   a first printing module, printing the second blended metal powder into small-sized samples; and
   a control module, controlling the raw material supply module to provide the metal powders to the first mixer module in sequence, according to a material composition and a print path of small sized samples to be made,
   wherein, the control module, controlling the first mixer module to stir the metal powder to be the first blended metal powder, then, providing the first blended metal powder to the second mixer, wherein, the second mixer stirs the first blended metal powder to be the second blended metal powder,
   wherein, the control module, obtaining a ratio of powder components of the second blended metal powder, and obtaining the second blended metal powder with a required ratio of powder components, controlling the printing module to use a selected second blended metal powder to generate small sized samples,
   wherein the first mixer module comprises:
   a first vertical powder mixer, using compressed air to mix at least two kinds of metal powder, in order to obtain a first blended powder, wherein, the first blended powder is used to generate the second blended metal powder, and a granularity of the metal powder used for generating the first blended powder is the same;
   a second vertical powder mixer, using compressed air to mix at least two kinds of metal powder, in order to obtain a second blended powder, wherein, the second blended powder is used to generate the second blended metal powder, and the granularity of the metal powder used to generate the second blended powder is the same;
   the first blended powder and the second blended powder are used to recite the first blended metal powder with different particle sizes;
   a first air pipe, connecting with the first vertical powder mixer or the second vertical powder mixer, wherein, the first air pipe is used for providing a first airflow for the first vertical powder mixer or the second vertical powder mixer;

a second air pipe, connecting with the second vertical powder mixer or the first vertical powder mixer, wherein, the second air pipe, providing a second air flow for the second vertical powder mixer or the first vertical powder mixer, wherein, the first air pipe and the second air pipe are connected with either of the first vertical powder mixer or the second vertical powder mixer; and a first turnplate, which is arranged at a lower end of the first vertical powder mixer to connect with the first air pipe; the first turnplate, adding different volumes of the first blended metal powder to the second mixing module by controlling a rotation angle, and wherein the second mixer comprises a second turnplate, which is arranged at a lower end of the second mixer; the second turnplate, driving the first and second vertical powder mixers to rotate clockwise and/or counterclockwise, wherein, the first air pipe and the second air pipe do not provide the first air flow and the second air flow when the second turnplate rotates clockwise or counterclockwise; connecting the first air pipe and the second air pipe to provide the first air flow and the second air flow when a rotation of the second turnplate stops; and connecting the first air pipe and the second air pipe to provide the first air flow and the second air flow during rotation when a rotation radius of the second turnplate does not exceed a length of the second air pipe during clockwise and counterclockwise rotation, wherein the second mixer uses the first air flow and the second air flow to prepare the first blended powder and the second blended powder into the second blended metal powder with a same granularity, wherein, the second mixer is arranged at an upper end of the first printing module.

2. The high-throughput 3D printing system for preparing multi-component, small sized samples as claimed in claim 1, wherein the high-throughput 3D printing system is a desktop system.

3. The high-throughput 3D printing system for preparing multi-component, small sized samples as claimed in claim 2, wherein, the raw material supply module consists of a plurality of groups of material storage units, and each group of material storage units is used for storing metal powders, and when storage units store the metal powders, the granularity of metal powder in each group of the material storage units is different; when storage units store the different kinds of metal powder, the granularity of the metal powder in each group of the material storage units could be the same or different.

4. The high-throughput 3D printing system for preparing multi-component, small sized samples as claimed in claim 1, wherein, the control module, controlling the first turnplate, the second turnplate, the first air pipe and the second air pipe; and the control module, obtaining a granularity of metal powders to control the first mixer module and the second mixer to generate the second blended metal powder.

5. The high-throughput 3D printing system for preparing multi-component, small sized samples as claimed in claim 4, wherein the high-throughput 3D printing system also comprises:

an ultrafine powder mixer, decompressing and grinding the second blended metal powder into ultrafine powder;

an ultrasonic vibrator, which is arranged outside the ultrafine powder mixer for assisting in preparation of ultrafine powder;

a honeycomb sleeve, having a plurality of honeycomb holes, and bearing the ultrafine powder through honeycomb holes to generate small-size samples.

6. The high-throughput 3D printing system for preparing multi-component, small sized samples as claimed in claim 5, wherein, the control module, controlling the ultrafine powder mixer, the ultrasonic vibrator, the second printer module and the honeycomb sleeve;

the control module, controlling the ultrafine powder mixer and the ultrasonic vibration according to a granularity and a volume of the metal powders required for small-sized samples.

7. The high-throughput 3D printing system for preparing multi-component, small sized samples as claimed in claim 6, wherein, the control module, stirring the second blended metal powder to obtain the granularity required, and controlling the honeycomb sleeve to prepare small-size samples.

8. The high-throughput 3D printing system for preparing multi-component, small sized samples as claimed in claim 6, wherein, the control module, grinding the second blended metal powder to obtain a different granularity, and controlling the honeycomb sleeve to prepare small-size samples.

* * * * *